Aug. 7, 1951 G. F. DARRACOTT ET AL 2,563,218
LAMINATED AIRFOIL SECTION AND METHOD OF MAKING SAME
Filed April 9, 1948 4 Sheets-Sheet 1

INVENTORS
George F. Darracott
Gerald N. Barba
Ludwig Reichert
BY
M. B. Parker
ATTORNEY Aug. 7, 1951  G. F. DARRACOTT ET AL  2,563,218
LAMINATED AIRFOIL SECTION AND METHOD OF MAKING SAME
Filed April 9, 1948  4 Sheets-Sheet 2

INVENTORS
George F. Darracott
Gerald N. Barba
Ludwig Reichert
BY
M. B. Tasker
ATTORNEY INVENTORS
George F. Darracott
BY Gerald N. Barba
Ludwig Reichert
M. B. Tasker
ATTORNEY Aug. 7, 1951  G. F. DARRACOTT ET AL  2,563,218
LAMINATED AIRFOIL SECTION AND METHOD OF MAKING SAME
Filed April 9, 1948  4 Sheets-Sheet 4
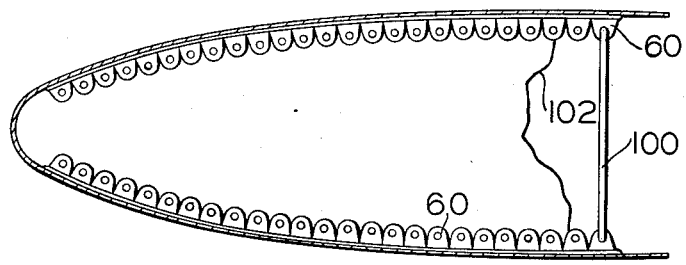
Fig. 7
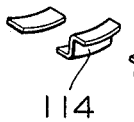
Fig. 9
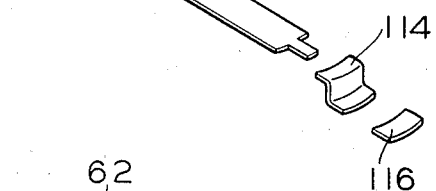
Fig. 10
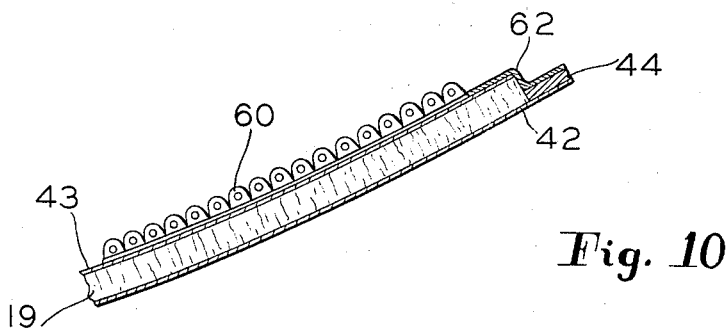
INVENTORS
George F. Darracott
Gerald N. Barba
Ludwig Reichert
BY
M. B. Tasker
ATTORNEY Patented Aug. 7, 1951

2,563,218

UNITED STATES PATENT OFFICE 2,563,218

LAMINATED AIRFOIL SECTION AND METHOD OF MAKING SAME

George F. Darracott, Stratford, Gerald N. Barba, Fairfield, and Ludwig Reichert, Stratford, Conn., assignors to United Aircraft Corporation, East Hartford, Conn., a corporation of Delaware Application April 9, 1948, Serial No. 20,126

6 Claims. (Cl. 244—123)

This invention relates to improved laminated composite structures and methods of fabricating the same and particularly to the manufacture of aircraft components such as airfoils and the like.

With the advancement of design of high-performance aircraft, it becomes progressively more important to provide aircraft structural material and components possessing unusual properties. In order to fully realize the inherent low drag characteristics of laminar flow airfoil sections, it is necessary that extreme smoothness of all exterior surfaces be obtained. In order to attain this desired degree of smoothness, laminated composite panels of metal and wood, properly fabricated, can approach the optimum condition since airfoil sections and components may be manufactured with the desired smoothness while still affording the necessary strength and rigidity with a minimum of weight.

Therefore it is an object of this invention to provide improved laminated structures and improved methods of bonding and forming laminated airfoil sections.

It is a further object of this invention to provide airfoils for high speed, low drag aircraft possessing extreme smoothness, strength, rigidity, and having contours of close dimensional tolerance.

A further object of the invention is generally to improve aircraft structures and methods of making them.

These and other objects will become apparent from the following detailed description of a preferred process for the assembly of laminated panels and the fabrication of such panels into aircraft components such as airfoils.

Figure 5:
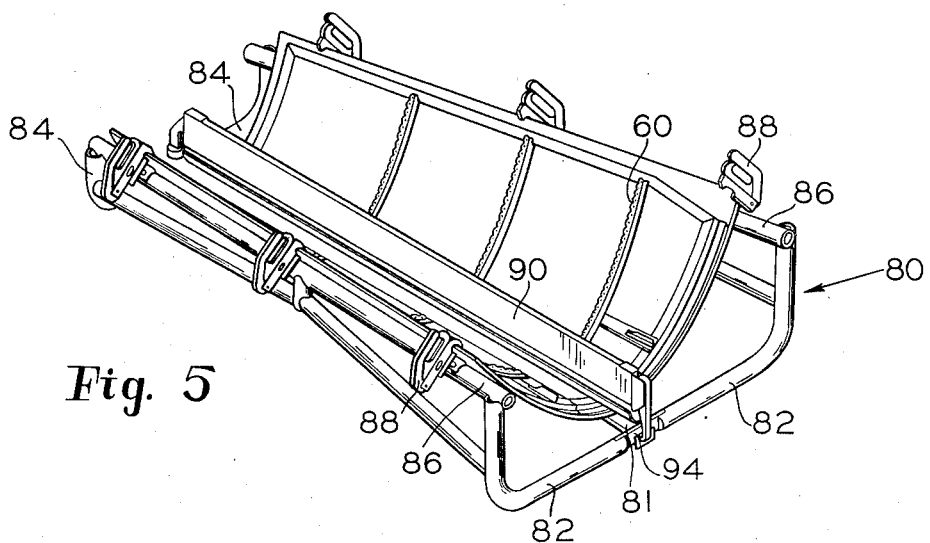

Fig. 5 indicates a partially curved panel including its attachments within the open, special bending jig used in the improved process.

Figure 6:
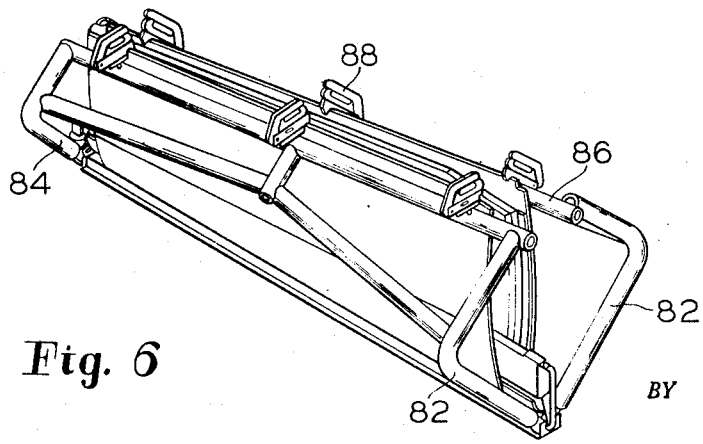

Fig. 6 is a view similar to Fig. 5 showing the special jig in the closed, or folded, position.

Fig. 7 is a cross section of a typical airfoil constructed according to this invention showing the position of the flanges on the inner surfaces which may form the base for rib construction.

Figure 8:
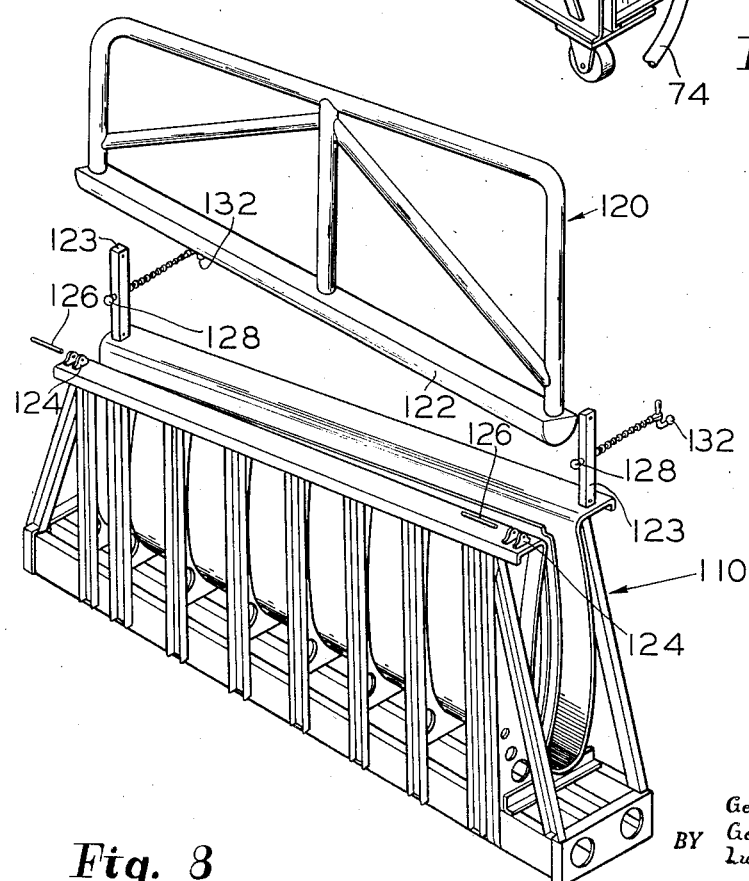

Fig. 8 is a perspective view showing a mold containing a bent panel and the compression member used for applying pressure to an inner nose core surface plate during final curing of the airfoil.

Fig. 9 is a detailed perspective view of the inner surface plate and associated parts used on the nose core of a laminated airfoil.

Fig. 10 is an enlarged sectional view of a laminated panel, the section being taken near the edge of the panel.

Figure 1:
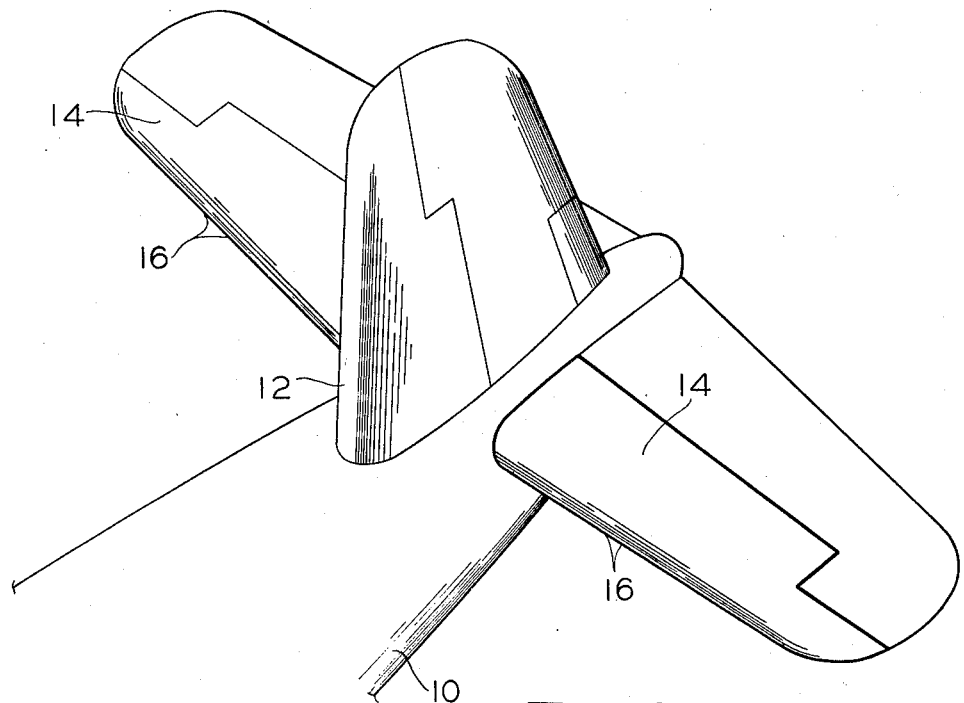
Fig. 1 is a perspective view of an airplane empennage having horizontal stabilizers constructed according to this invention.

Fig. 1 generally indicates the tail assembly of an airplane 10 having a vertical stabilizer 12 and horizontal stabilizers 14 having sharply curved leading edges 16 and constructed according to this invention.

In manufacturing airfoil sections of composite laminated panels of wood and metal it is desirable to pre-form portions of the core of such panels in order to minimize stresses and strains when the panel is subsequently sharply bent. The core is constructed of a plurality of wood pieces, such as balsa, which are bonded together to form a sheet of the desired size and thickness. A core sheet section is usually sliced from a bolt which has been made up of a number of like density wood planks. Usually the core sheet is initially cut slightly thicker than necessary and later sanded to the desired thickness and routed where necessary for accommodating internal doublers and splice plates. The entire core sheet is assembled so that the grain of the wood lies normal to the surface sheets which are bonded to both sides of the core. The advantages of having the end of the grain fibers abutting the surface sheets is readily apparent inasmuch as the grain structure permits flexibility perpendicular to the grain fibers but still provides great compression strength parallel to the fibers.

Figure 2:
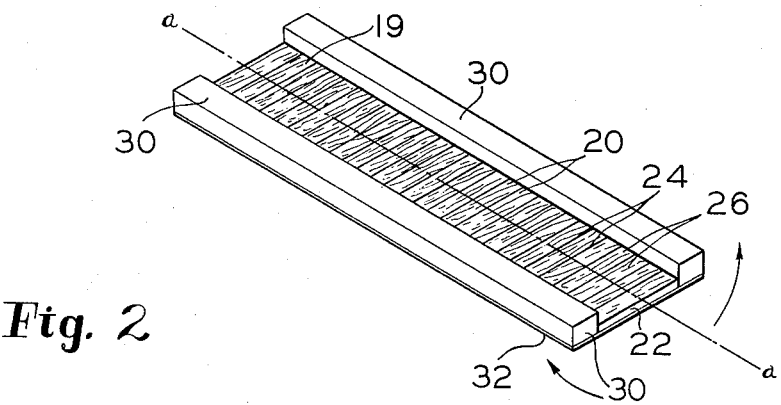
Fig. 2 is a perspective view of the core strip along the bend line of a panel which is to be sharply bent, showing the strip in a pre-forming frame.

In addition, the core pieces are specially arranged in the area where the sharp bends are anticipated; thus, for example, in the area of a leading edge of a stabilizer the core pieces are arranged substantially as shown in Fig. 2. Herein the core section 19 consists of a plurality of rectangular pieces 20 laterally disposed along the airfoil leading edge, or the bend axis $a$—$a$, so that the ends of the grain 22 will be normal to the surface sheets later to be bonded thereto.

Also the bond lines 24 between adjacent pieces and the annual or seasonal growth lines 26 of the pieces lie substantially parallel to each other and substantially perpendicular to the bend axis a—a. This method of arranging the bond lines between core pieces and the annual or seasonal growth lines of the wood of said pieces in the bend area is fully described and claimed in a copending patent application Serial No. 11,425, filed February 27, 1948, and assigned to the assignee of this application. The core pieces in the relatively flat or mildly curved sections may be arranged at random with respect to the bond lines and annual or seasonal growth lines.

Whereas the significance of "annual" growth lines is well known to those familiar with domestic forestry practices and products, the alternative expression "seasonal" growth lines may require some explanation. In the development of certain tropical trees, such as balsa, a plurality of growth rings or lines are often produced in the course of a single year. Accordingly, the term "seasonal" growth lines is intended to denote such characteristic growth markings whether there be one or more for a given year.

As previously mentioned, the core sheet or any portion thereof may be pre-formed when sharply bent articles are to be made; that is, the core is partially bent prior to assembly in order to facilitate further bending during the final processes of fabrication. In the process being disclosed, the leading edge portion of the wood core is pre-formed. In pre-forming the leading edge portion of the wood core it is the usual practice to insert the section of the core sheet to be pre-formed as shown in Fig. 2, between two restraining members 30 which in turn are fastened to a piece of flexible material 32 forming a compression frame which firmly secures the core section. Pressure is then applied to the restraining members 30 as indicated by the arrows in Fig. 2. When the core is bent around the center line a—a to the desired curvature it is held in this position for a sufficiently long period of time so that a permanent set takes place. The amount of spring-back of the core is taken into consideration so that the final bend will be to the curvature desired. By keeping the wood core in compression between members 30 while bending, tensile stress on the outer perimeter is reduced to a point where such forces are negligible. Other methods of pre-forming the core can be utilized. However, dry compression bending in a frame similar to that shown in Fig. 2 has been found to be most efficient and satisfactory.

Figure 3:
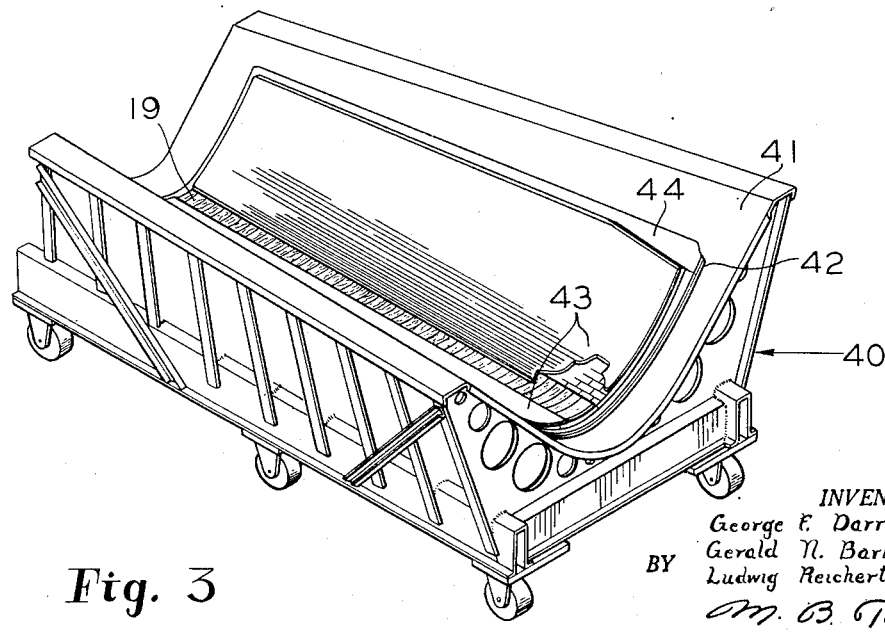
Fig. 3 is a perspective view of a partially curved panel aligned within a typical curing mold.

After pre-forming of the core sheet has been accomplished, where required, it is necessary to form a laminated structure including the bonding thereof. This bonding procedure is one of the most important steps in the manufacture of the panels and airfoils because extremely high strength bonds must be made to obtain the necessary strength in the laminated assembly. Thin metal sheets of aluminum or other materials of a higher density than the core material are thoroughly cleaned and coated with a layer of thermo-setting adhesive having an affinity for the metal or surfacing material. The adhesive is cured thereon at a relatively high temperature. Following this, a coating of a second thermo-setting adhesive which has a high affinity for the first-mentioned cured adhesive and for the wood core is applied to the surface sheets. The core and metal sheets are then assembled in a mold as shown in Fig. 3 in preparation for curing under proper temperature and pressure consistent with the type of core material being used. A single adhesive which has affinity for both the core and the surface sheets could be used provided the bond between the core and the surface sheets achieves the proper strength requirements.

Referring to Fig. 3 the assembled panel is placed in the mold 40 having a facing sheet 41. The outer surface sheet 42 of the laminated panel completely covers and extends beyond the core sheet, whereas the inner facing sheet consists of two sections 43 spaced so that the core section 19 on the inside surface of the leading edge of the airfoil is exposed along the bend axis. This is done in order to facilitate subsequent bending of the entire panel for reasons that will be explained later. The inner facing sheet can be made of any number of pieces depending on the type of article being made. When additional pieces are used overlapping splice plates are employed for attaching their abutting edges. In this stage of the process high density wood reinforcements 44, such as mahogany, are assembled around the outer edge of the core and bonded thereto and to the overlying edges of the lower surface sheet. As better shown in Fig. 10, slotted flanges 60 then may be adhesively bonded to the sections 43 of the inner facing sheet for the purpose of providing stiffeners and rib attaching members and joggled metal edging 62 may be adhesively bonded to the sections 43 to protect the edges of the core sheet or its reinforcing edges. The edging 62 serves to form a seal for the exposed core edges and also serves as a surface sheet for the reinforcements 44.

Figure 4:
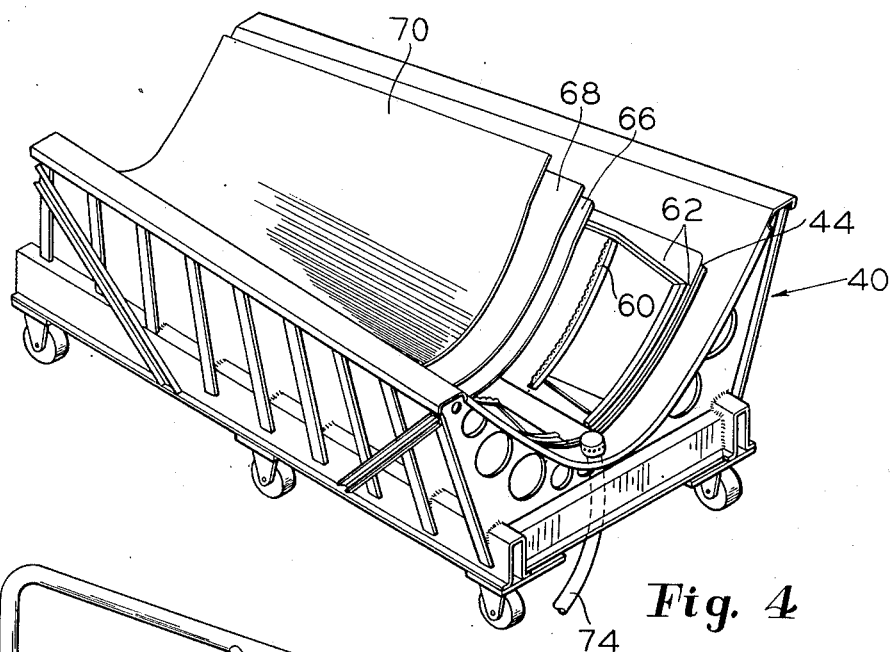
Fig. 4 is a view similar to Fig. 3 but additionally shows the flanges, stiffeners, and edging pieces attached to a panel and also shows the layers of blankets used during the application of applying pressure while curing the panel.

In order to exert proper force on the panel to insure intimate contact of the bonded surfaces while in the mold during curing, a pressure blanket system is used (Fig. 4). A canvas sheet 66 is first placed over the assembled panel over which a ribbed or pyramid type rubber covering 68 is laid. A final neoprene sheet 70 covering is used to seal the entire pressure assembly against the mold. It is desirable to evacuate the air from under the blankets either before or during curing, depending on the particular method of curing used, and a vacuum connection 74 is therefore provided on the mold 40. The entire assembly is then placed in an autoclave or some other means for applying the temperatures and pressures necessary for proper curing.

After the partially assembled panel has been properly cured it is then taken from the mold in its partially bent condition and placed in a special bending jig 80 shown in Fig. 5. Preferably this jig consists of a longitudinal base 81 having upwardly bent arms 82 and 84 projecting outwardly from the ends of the base 81. Longitudinal supports 86 connect the ends of the arms 82 and 84 forming frames on either side of the base. The supports 86 carry a plurality of clamping fixtures 88 for firmly securing the edges of the panel assembly to the jig. After the panel is inserted in the jig a compression member 90 is latched in place above the panel and parallel to the base 81. Each of the pairs of arms 82 and 84 are pivotally connected at each extremity of the jig base 81 within a hinge housing 94 which supports a double acting hinge mechanism. When the sides of the jig are raised toward a closed position (Fig. 6)

the hinge mechanism imparts an outward and upward movement to the frames so that the clamping fixtures 88 are actually extended in distance from a fixed pivot pin within the hinge mechanism. Inasmuch as the airfoil section being bent is tapered, the jig itself has a tapered configuration and the hinge mechanism in the smaller end of the jig imparts a somewhat lesser extension to the clamping fixtures in that end of the jig. The reason for the foregoing is obvious since the edges of the panel in the smaller end of the jig will travel a shorter distance than the edges of the panel in the larger end for any given degree of pivotal movement. It is readily apparent that during the bending process the core of the panel along the bend will be kept in compression by the member 90 to prevent any ruptures or fractures in the panel assembly along the bend lines. The clamping fixtures 88 maintain the panel assembly in position during the bending process and help to keep compression along the bend axis by maintaining the panel firmly against the compression member 90.

A complete description and method of operation of this jig is disclosed and claimed in Patent No. 2,474,652, issued June 28, 1949, to Emil V. Block and assigned to the assignee of this application.

After the laminated panel assembly is secured to the jig, suitable forces are applied equally to the frames to fold the jig and thereby bend the panel to the desired curvature.

When the proper curvature has been reached, temporary ties 100 are attached (Fig. 7) to the flanges 60 in order to fasten the free ends of the bent panel and retain it in a bent position to permit transfer of the folded or bent panel assembly from the jig to a final processing mold 110 shown in Fig. 8. Once the panel assembly is inserted in the mold 110 the ties 100 are removed. It is then necessary to insert the preformed surface plate 112 (Fig. 9), wooden edge reinforcements 116 and metal edging pieces 114 over the exposed inner core surface 19 (Fig. 3) at the leading edge of the assembly. It should be noted that the core along the sharp bend line has been left exposed during fabrication to provide flexibility and eliminate excessive stress concentrations during the bending process. The surface plate 112 and adjacent pieces 114 and 116, after having been coated with the thermo-setting adhesives mentioned above are properly positioned and a compression frame 120 (Fig. 8) is laid over them. This compression frame 120 has a lower longitudinal member 122 which approximately fits the contour of the surface plate 112 and the inner surface of the leading edge of what now can be termed the airfoil assembly. Positive pressure is then applied vertically to the compression frame 120 by dropping the free ends of the bars 123 of the mold 110 into the slots 124, locking them in place with the pins 126 and rotating the screw jack handles 132. It is then apparent that the shoes 128 will bear upon the upper surface of the frame 120 to force intimate contact between the surface plate 112 and the exposed core section 19. The entire airfoil assembly while still within the mold 110 is then subjected to proper temperatures in order to finally cure the entire structure.

After final curing reinforcing ribs 102 may be riveted or bolted to the flanges 60. Because of the rigidity inherent in the laminated airfoil assembly described herein, it is not necessary, however, to provide as many reinforcing rib members as in a conventional airfoil.

As a result of this invention curved aircraft components such as airfoils and the like can be constructed having high strength properties, light weight and exceptional surface smoothness which contributes to excellent low drag characteristics, giving significant improvements in the speed and range of aircraft. Additionally, airfoil sections can be provided with a minimum of secondary items such as ribs, frames, and stiffeners.

In addition, in structural assemblies such as cockpit and other fuselage sections absence of internal structural members permits clean lines and space for additional internal equipment.

While a specific airfoil and the method of making it has been described above, it will be evident that the invention is applicable to other aircraft parts and that various changes may be made in the method used to construct these parts without departing from the scope of the invention.

We claim:

1. A laminated airfoil section comprising spaced curved surface sheets of high density material adhesively bonded to a continuous core sheet of wood which has the ends of the grain abutting said surface sheets, said core sheet in the area of the leading edge of said airfoil comprising a plurality of pieces adhesively bonded together having the bond lines between said pieces and the seasonal growth lines of said pieces substantially perpendicular to said leading edge, said core and surface sheets forming a continuous panel having a curvature corresponding to the contour of said airfoil, a plurality of spaced flanges attached to each of the upper and lower internal surfaces of said airfoil shaped panel in chordwise planes of said airfoil, and means for rigidly connecting said flanges to internal structure adapted to be disposed in said airfoil.

2. A composite sharply bent laminated wood and metal panel comprising, a core sheet of low density wood having the grain running normal to the major surfaces of said sheet, inner and outer surface sheets of metal adhesively bonded to said core sheet, said outer sheets being larger than and extending beyond the edges of said core sheet, said inner sheet having two sections having a combined area smaller than said core sheet, said sections being spaced in the area of the bend, high density wood edging strips, means for bonding said strips to the edges of said core sheet and to the extended edge portions of said outer surface sheet, metal edging along said panel edges, means for bonding said edging to said panel, a surface plate covering the space on said core between said sections, and adhesive means for bonding said surface plate to said core sheet.

3. In a method of fabricating sharply bent airfoil sections of composite laminated structure the steps comprising, assembling a core sheet comprising a plurality of pieces of wood having a length along the grain equal to the thickness of the core, adhesively securing said pieces together to form a core sheet, adhesively bonding a metal sheet to the face of said core sheet which is to become the outer surface of the airfoil, adhesively bonding spaced metal sheets to the other face of said core sheet on opposite sides of the axis about which the bend is to take place, curing said assembly under suitable temperature and pressure to form a unitary laminated panel, bending said panel in a jig to conform the panel to airfoil shape, transferring said airfoil to a mold, adhesively bonding a surface plate to the inner exposed surface of said core along the bend axis, and curing said adhesive while said surface plate is held under pressure in said mold.

4. In a method for fabricating airfoils of composite laminated structure the steps comprising, adhesively bonding a core sheet of wood between spaced surface sheets of metal with thermosetting adhesives under proper temperature and pressure to form a laminated panel, inserting said panel in a tapered bending jig, applying pressure to fold the jig along a bend line to form the leading edge of a tapered airfoil, temporarily restraining the free ends of said bent panel until the panel is transferred to a mold, and curing said panel in said mold under suitable temperature and pressure to permanently fix said panel in a tapered airfoil shape.

5. In a method of fabricating sharply bent airfoil sections of composite laminated structure the steps comprising, assembling a core sheet comprising a plurality of pieces of wood having a length along the grain equal to the thickness of the core, adhesively securing said pieces together to form a core sheet in which the ends of the grain comprise the major surfaces of the sheet, adhesively bonding a surface sheet to the face of said core sheet which is to become the outer surface of the airfoil, adhesively bonding surface sheets to the other face of said core sheet on opposite sides of the axis about which the bend is to take place, said sheets being spaced apart to expose an area therebetween in the vicinity of the bend axis, adhesively bonding flange members to said spaced surface sheets, curing said assembly under suitable temperature and pressure to form a unitary laminated panel, bending said panel to an airfoil shape, transferring said airfoil to a mold for adhesively bonding a surface plate to the inner exposed surface of said core sheet along the bend axis, curing said adhesive while said plate is held under pressure in said mold, and attaching bridging means between said flanges to hold said airfoil to maintain said airfoil shape.

6. In a method of making sharply bent articles of composite laminated structure the steps comprising, forming a core sheet by adhesively bonding a plurality of pieces of low density fibrous material having the fibres running substantially normal to the major surface of said core sheet and having a length along the grain equal to the thickness of said core sheet, coating a surface sheet of comparatively high density material with a thermosetting adhesive having an affinity for said higher density material, curing said adhesive, coating said cured adhesive surface with a second adhesive having an affinity for the low density core material and the cured adhesive, similarly preparing two sheets for the other surface of said core sheet, assembling said core and surface sheets to form a laminated panel, the two sheets on the other surface of said core sheet being spaced apart along the bend axis, curing said panel under proper temperature and pressure, bending said panel in a jig while maintaining the area of said core in the vicinity of the bend axis under compression, connecting the free ends to retain the panel in said bent shape, placing said bent panel in a mold conforming to the desired final contour of the bent article, bonding a surface plate to the exposed core area along the bend axis, and finally curing the entire assembled article in said mold.

GEORGE F. DARRACOTT.
GERALD N. BARBA.
LUDWIG REICHERT.

REFERENCES CITED

The following references are of record in the file of this patent:

UNITED STATES PATENTS

| Number | Name | Date |
| --- | --- | --- |
| 1,346,161 | Basquin | July 13, 1920 |
| 1,757,779 | Navratil | May 6, 1930 |
| 1,822,940 | Sundstedt | Sept. 15, 1931 |
| 1,874,685 | Wright | Aug. 30, 1932 |
| 2,306,295 | Casto | Dec. 22, 1942 |
| 2,503,450 | Nebesar | Apr. 11, 1950 |

FOREIGN PATENTS

| Number | Country | Date |
| --- | --- | --- |
| 362,925 | Great Britain | Nov. 30, 1931 |
| 440,714 | Great Britain | Jan. 3, 1936 |
| 484,305 | Great Britain | May 3, 1938 |
| 519,061 | Great Britain | Mar. 15, 1940 |